(12) United States Patent
Osawa et al.

(10) Patent No.: US 11,552,742 B2
(45) Date of Patent: Jan. 10, 2023

(54) USER EQUIPMENT AND BASE STATION APPARATUS

(71) Applicant: NTT DOCOMO, INC., Tokyo (JP)

(72) Inventors: Ryosuke Osawa, Tokyo (JP); Yuki Matsumura, Tokyo (JP); Kazuaki Takeda, Tokyo (JP); Huan Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/259,790

(22) PCT Filed: Jul. 17, 2018

(86) PCT No.: PCT/JP2018/026774
§ 371 (c)(1),
(2) Date: Jan. 12, 2021

(87) PCT Pub. No.: WO2020/016940
PCT Pub. Date: Jan. 23, 2020

(65) Prior Publication Data
US 2021/0314097 A1 Oct. 7, 2021

(51) Int. Cl.
*H04L 1/18* (2006.01)
*H04L 5/00* (2006.01)
*H04W 4/40* (2018.01)

(52) U.S. Cl.
CPC .......... *H04L 1/1816* (2013.01); *H04L 1/1854* (2013.01); *H04L 1/1861* (2013.01);
(Continued)

(58) Field of Classification Search
CPC ................. H04L 1/1816; H04L 1/1854; H04L 1/1861; H04L 1/1864; H04L 5/0037; H04L 5/0055
See application file for complete search history.

(56) References Cited

U.S. PATENT DOCUMENTS

| 2012/0327760 | A1 | 12/2012 | Du et al. |
| 2014/0086152 | A1* | 3/2014 | Bontu ............... H04L 1/1816 370/329 |
| 2014/0226552 | A1 | 8/2014 | Niu et al. |
| 2015/0078279 | A1 | 3/2015 | Ko et al. |

(Continued)

FOREIGN PATENT DOCUMENTS

WO 2014/046715 A1 3/2014

OTHER PUBLICATIONS

International Search Report issued in PCT/JP2018/026774 dated Sep. 18, 2018 (4 pages).

(Continued)

*Primary Examiner* — Min Jung
(74) *Attorney, Agent, or Firm* — Osha Bergman Watanabe & Burton LLP

(57) ABSTRACT

A user equipment includes a receiving unit configured to receive a first signal of inter-terminal direct communication transmitted from a first user equipment, and information indicating a first resource for transmitting a HARQ (Hybrid Automatic Repeat Request) response corresponding to the first signal of inter-terminal direct communication transmitted from either one of a base station apparatus or the first user equipment; a control unit configured to determine the HARQ response based on a reception result of the first signal of inter-terminal direct communication; and a transmitting snit configured to transmit the determined HARQ response to the base station apparatus or the first user equipment, by using the first resource for transmitting the HARQ response.

7 Claims, 10 Drawing Sheets

(52) U.S. Cl.
CPC .......... *H04L 1/1864* (2013.01); *H04L 5/0037* (2013.01); *H04L 5/0055* (2013.01); *H04W 4/40* (2018.02)

(56) References Cited

U.S. PATENT DOCUMENTS

| | | | |
|---|---|---|---|
| 2016/0338095 A1 | 11/2016 | Faurie et al. | |
| 2018/0206176 A1* | 7/2018 | Panteleev | H04W 76/14 |
| 2018/0255532 A1* | 9/2018 | Li | H04L 1/18 |
| 2020/0059766 A1* | 2/2020 | Kim | H04L 5/0055 |
| 2020/0267715 A1* | 8/2020 | Seo | H04L 1/1854 |
| 2021/0377710 A1* | 12/2021 | Kim | H04W 4/40 |
| 2022/0078753 A1* | 3/2022 | Park | H04L 5/0055 |
| 2022/0140956 A1* | 5/2022 | Park | H04L 1/1812 370/329 |

OTHER PUBLICATIONS

Written Opinion of the International Searching Authority issued in PCT/JP2018/026774 dated Sep. 18, 2018 (4 pages).

3GPP TS 36.211 V15.1.0; "3rd Generation Partnership Project; Technical Specification Group Radio Access Network Evolved Universal Terrestrial Radio Access (E-UTRA); Physical channels and modulation (Release 15)"; Mar. 2018 (227 pages).

3GPP TT 22.886 V15.1.0; "3rd Generation Partnership Project; Technical Specification Group Services and System Aspects; Study on enhancement of 3GPP Support for 5G V2X Services (Release 15)"; Mar. 2017 (58 pages).

Extended European Search Report issued in Application No. 18926533.3 dated Feb. 25, 2022 (8 pages).

Notice of Reasons for Refusal issued in Japanese Application No. 2020-530770 dated Aug. 9, 2022 (5 pages).

Notice of Reasons for Refusal issued in Japanese Application No. 2020-530770 dated Nov. 1, 2022 (5 pages).

Vivo, "DCI content size and compression", 3GPP TSG RAN WG1 NR Ad-Hoc Meeting #2, R1-1710395, Qingdao, P.R. China, Jun. 27-30, 2017 (4 pages).

Huawei, HiSilicon, "Discussion on sidelink resource allocation and configuration", 3GPP TSG RAN WG1 Meeting #90, R1-1712135, Prague, Czech Republic, Aug. 21-25, 2017 (6 pages).

* cited by examiner

HARQ-ACK RESOURCE OF
20A, 20B, 20C, AND 20D

USER EQUIPMENT AND BASE STATION APPARATUS

TECHNICAL FIELD

The present invention relates to a user equipment and a base station apparatus in a radio communication system.

BACKGROUND ART

In LTE (Long Term Evolution) and successor systems of LTE (for example, LTE-A (LTE Advanced) and NR (New Radio) (also referred to as 5G)), a D2D (Device to Device) technology in which user equipments directly communicate with each other without involving a radio base station, is being studied (for example, Non-Patent Literature 1).

D2D reduces the traffic between the user equipment and the base station apparatus, and enables communication between the user equipments even when the base station apparatus becomes unable to communicate in the event of a disaster, etc. Note that in 3GPP (3rd Generation Partnership Project), D2D is referred to as "sidelink"; however, in the present specification, D2D, which is a more general term, is used. However, sidelink is also used as necessary in the description of the embodiment to be described later.

D2D is generally classified into D2D discovery (also referred to as D2D detection) for discovering other communicable user equipments and D2D communication (also referred to as D2D direct communication, inter-terminal direct communication, etc.) for user equipments to directly communicate with each other. In the following description, when D2D communication, D2D discovery, etc., are not particularly distinguished, these may be simply referred to as D2D. Furthermore, signals used for transmission and reception in D2D are referred to as D2D signals. Various use cases of services related to V2X (Vehicle to Everything) in NR are being studied (for example, Non-Patent Literature 2).

CITATION LIST

Non-Patent Literature

[NPTL 1] 3GPP TS 36.211 V15.1.0 (2018-03)
[NPTL 2] 3GPP TR 22.886 V15.1.0 (2017-03)

SUMMARY OF INVENTION

Technical Problem

In D2D communication, when managing QoS (Quality of Service), it is required to implement HARQ (Hybrid Automatic Repeat request) processing in D2D communication. However, in the conventional D2D communication, HARQ processing has not been supported.

The present invention has been made in view of the above points, and it is an object of the present invention to appropriately perform re-transmission control in inter-terminal direct communication.

Solution to Problem

According to the disclosed technology, there is provided a user equipment including a receiving unit configured to receive a first signal of inter-terminal direct communication transmitted from a first user equipment, and information indicating a first resource for transmitting a HARQ (Hybrid Automatic Repeat Request) response corresponding to the first signal of inter terminal direct communication transmitted from either one of a base station apparatus or the first user equipment; a control unit configured to determine the HARQ response based on a reception result of the first signal of inter-terminal direct communication; and a transmitting unit configured to transmit the determined HARQ response to the base station apparatus or the first user equipment, by using the first resource for transmitting the HARQ response.

Advantageous Effects of Invention

According to the disclosed technology, in inter-terminal direct communication, re-transmission can be appropriately controlled.

DESCRIPTION OF EMBODIMENT

Figure 1:
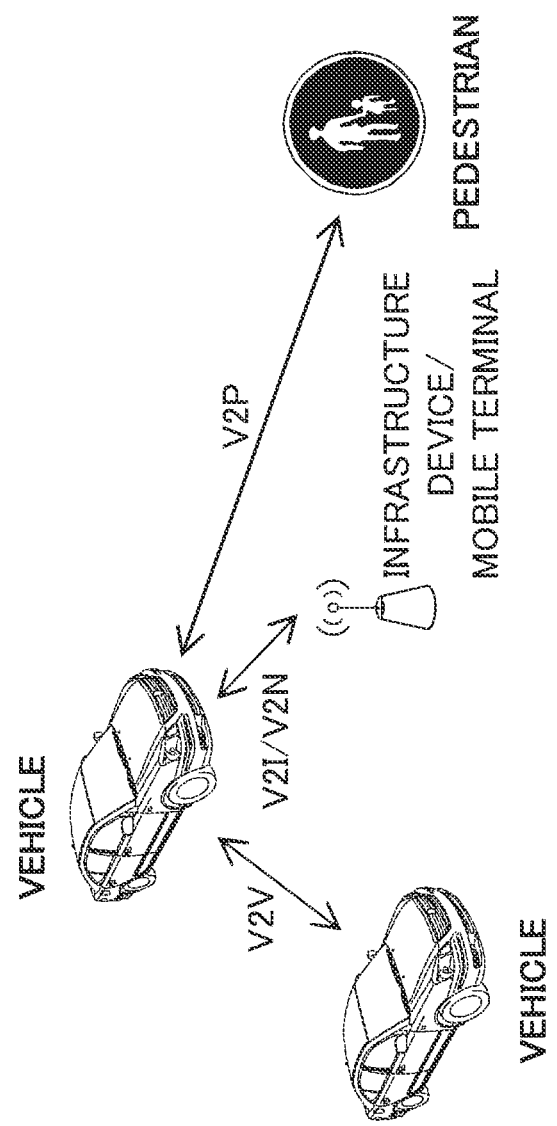
FIG. 1 is a diagram for describing V2X.

Hereinafter, an embodiment of the present invention will be described with reference to the drawings. Note that the embodiment described below is merely an example, and embodiments to which the present invention is applied are not limited to the following embodiment.

In the operation of the radio communication system according to an embodiment of the present invention, the existing technology is appropriately used. The existing technology is, for example, existing LTE; however, the existing technology is not limited to existing LTE. Furthermore, the term "LTE" used in the present specification shall have a broad meaning including LTE-Advanced and methods after LTE-Advanced (e.g., NR) unless otherwise specified.

Furthermore, in the present embodiment, the duplex method may be the TDD (Time Division Duplex) method, the FDD (Frequency Division Duplex) method, or other methods (for example, the Flexible Duplex method).

Furthermore, in the following description, the method of transmitting signals by using transmission beams, may be digital beamforming for transmitting signals multiplied by precoding vectors (precoded with precoding vectors), or may be analog beamforming for realizing beamforming by using a variable phase shifter in an RF (Radio Frequency) circuit. Similarly, the method of receiving signals by using reception beams, may be digital beamforming for multiplying received signals by a predetermined weight vector, or analog beamforming for realizing beamforming by using a variable phase shifter in an RF circuit. Hybrid beamforming, in which digital beamforming and analog beamforming are combined, may be applied. Also, transmitting signals by using transmission beams, may be to transmit signals at a particular antenna port. Similarly, receiving signals by using reception beams may be to receive signals at a particular antenna port. An antenna port refers to a logical antenna port or a physical antenna port defined in the 3GPP standard. Furthermore, the precoding or the beamforming may be referred to as a precoder or a spatial domain filter, etc.

Note that the method of forming a transmission beam and a reception beam is not limited to the above method. For example, in the base station apparatus 10 or the user equipment 20 having a plurality of antennas, a method of changing the angle of each antenna may be used, or a method using a combination of a method of using a precoding vector and a method of changing the angle of the antenna may be used, a method of switching between different antenna panels may be used, a method of combining a plurality of antenna panels may be used, or another method may be used. Furthermore, for example, in the high frequency band, a plurality of mutually different transmission beams may be used. Using a plurality of transmission beams is referred to as a multi-beam operation, and using one transmission beam is referred to as a single beam operation.

Furthermore, in the embodiment of the present invention, the radio parameter, etc., being "configured" means that a predetermined value is "pre-configured", or a radio parameter, which is reported from the base station apparatus 10 or a user equipment 20, is configured.

FIG. 1 is a diagram for describing V2X. In 3GPP, studies are being made to realize V2X (Vehicle to Everything) or eV2X (enhanced V2X) by extending the D2D function, and specifications of V2X are being made. As illustrated in FIG. 1, V2X is a part of ITS (Intelligent Transport Systems), and V2X is a collective term of V2V (Vehicle to Vehicle) meaning a communication mode implemented between vehicles, V2I (Vehicle to Infrastructure) meaning a communication mode implemented between a vehicle and a roadside unit (RSU) installed at the side of a road, V2N (Vehicle to Nomadic device) meaning a communication mode implemented between a vehicle and a mobile terminal held by a driver), and V2P (Vehicle to Pedestrian) meaning a communication mode implemented between a vehicle and a mobile terminal of a pedestrian.

Furthermore, in 3GPP, V2X using cellular communication and inter-terminal communication of LTE or NR is being studied. For V2X of LTE or NR, it is assumed that studies not limited to the 3GPP specification, will be advanced. For example, it is assumed that securing interoperability, reducing costs by implementing an upper layer, a method of using a plurality of RATs (Radio Access Technology) in combination or a method of switching the RATs, addressing regulations in each country, acquiring and distributing data of a V2X platform of LTE or NR, and managing and using a database, will be studied.

In the embodiments of the present invention, a mode in which a communication apparatus is installed in a vehicle is mainly assumed; however, the embodiment of the present invention is not limited to such a mode. For example, the communication apparatus may be a terminal held by a person, or the communication apparatus may be an apparatus installed in a drone or an aircraft, or the communication apparatus may be a base station, an RSU, or a relay station (relay node), etc.

Note that SL (Sidelink) may be distinguished based on either DL (Uplink) or DL (Downlink) or one of or a combination of the following 1)-4). Furthermore, the SL may be another name.
1) Resource allocation in time domain
2) Resource allocation in the frequency domain.
3) Synchronization signals (including SLSS (Sidelink Synchronization Signal)) to be referred to
4) Reference signals used for path loss measurement for transmission power control In SL of LTE, Mode 3 and Mode 4 are defined with respect to resource allocation for SL to the user equipment 20. In Mode 3, transmission resources are dynamically allocated by DCI (Downlink Control Information) transmitted from the base station apparatus 10 to the user equipment 20. Furthermore, in Mode 3, SPS (Semi Persistent Scheduling) is also possible. In Mode 4, the user equipment 20 autonomously selects a transmission resource from the resource pool.

Furthermore, SLSS is supported in SL of LTE. On the other hand, in SL of LTE, feedback in the PHY (Physical) layer, the MAC (Media Access Control) layer, and the RRC (Radio Resource Control) layer has not been supported. That is, reports of RSRP (Reference Signal Received Power) or RSRQ (Reference Signal Received Quality) of layer 1, or reports of CSI (Channel State Information), have not been supported.

Figure 2:
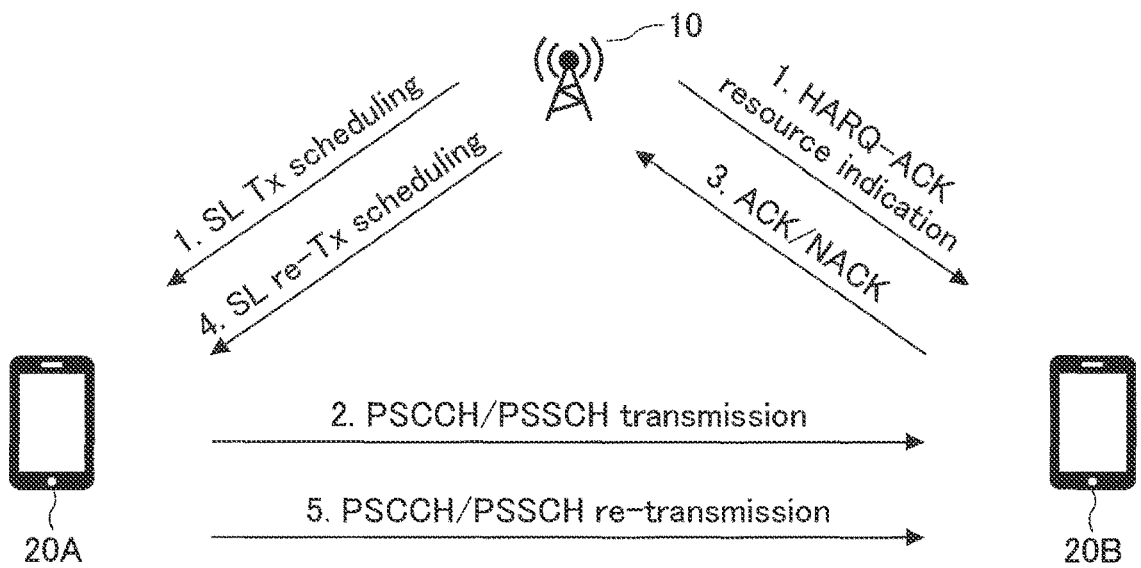
FIG. 2 is a diagram for describing an example (1) of HARQ re-transmission according to an embodiment of the present invention.

FIG. 2 is a diagram for describing an example (1) of HARQ re-transmission according to the embodiment of the present invention. It is assumed that QoS is managed in NR SL. Therefore, it is assumed that feedback in the PHY layer, the MAC layer, and the RRC layer is supported.

In SL transmission, ACK/NACK signaling to the base station apparatus 10 or the user equipment 20 by HARQ (Hybrid automatic repeat request) may be supported. The base station apparatus 10 or the user equipment 20 having a scheduling capability configures a "HARQ-ACK resource", that is, a resource used for transmission of a HARQ response (hereinafter referred to as "HARQ response resource"), and reports the HARQ response resource to the user equipment 20. The user equipment 20 having a scheduling capability determines and reports, with respect to another user equipment 20, at least one of an MCS (Modulation and Coding Scheme), a TBS (Transport block size), a rank or a number of transmission layers, resource allocation, transmission power, and transmission timing, based on an instruction from the base station apparatus 10 or autonomously. In FIG. 2, when the base station apparatus 10 is replaced with the user equipment 20, the transmission of the SL scheduling information may be performed via the SCI (Sidelink control information). In SL transmission, ACK/NACK is signaled to the base station apparatus 10 or the user equipment 20. When NACK is received, the base station apparatus 10 or the user equipment 20 requests re-transmission of PSCCH (Physical Sidelink Control Channel) and/or PSSCH (Physical Sidelink Shared Channel) to the user equipment 20 that has transmitted the PSCCH and/or PSSCH.

The association between the HARQ response resource and the corresponding SL transmission may be defined or configured in advance. In unicasting, one HARQ response resource is configured for each SL transmission. In multicasting or broadcasting, one or a plurality of HARQ response resources may be commonly configured for the ACK/NACK responses of all user equipments 20, for each SL transmission. Furthermore, in multicasting or broadcasting, a HARQ response resource may be configured for each ACK/NACK response of the user equipment 20, for each SL transmission.

The reporting of the HARQ response resource in the SL may be executed simultaneously with the scheduling of a resource used for the SL transmission, or SL transmission. The ACK/NACK bit of the HARQ response may be included in the UCI transmitted via the PUCCH or PUSCH of UL, or may be included in the SCI transmitted via the PSCCH of SL. The SCI may be transmitted in the same manner as the PSCCH, via PSSCH or PSDCH.

The base station apparatus 10, the user equipment 20 having a scheduling capability, or the user equipment 20 performing the transmission, executes a process related to the re-transmission of signals via PSCCH and/or the PSSCH, when the ACK/NACK signaling received by the HARQ response resource is NACK. Details of multiplexing of HARQ response resources in the case of SL and DL, and unicasting and broadcasting, will be described later.

As illustrated in FIG. 2, in step 1, the base station apparatus 10 transmits the SL scheduling information to the user equipment 20A, and transmits a report indicating the HARQ response resource of the SL to the user equipment 20B. Subsequently, in step 2, the user equipment 20A transmits signals via PSCCH and/or PSSCH to the user equipment 20B. Subsequently, in step 3, the user equipment 20B transmits, to the base station apparatus 10, the SL-ACK/NACK signaling determined based on the reception result of signals received via PSCCH and/or PSSCH, by using the HARQ response resource indicated by the report received in step 1. Signals indicating ACK may not be transmitted and only signals indicating NACK may be transmitted. Subsequently, in step 4, the base station apparatus 10 determines the SL scheduling information for re-transmission for the user equipment 20A based on the received SL-ACK/NACK signaling, and transmits the SL scheduling information to the user equipment 20A. Subsequently, in step 5, the user equipment 20A re-transmits the signals via PSCCH and/or PSSCH, to the user equipment 20B, based on the received SL scheduling information for re-transmission.

As described above, the base station apparatus 10 can transmit a report indicating the HARQ response resource of SL to the user equipment 20. Furthermore, the base station apparatus 10 can transmit, to the user equipment 20, the SL scheduling information for re-transmission determined based on the received SL-ACK/NACK signaling. The SL scheduling information for reporting or re-transmission indicating HARQ response resource of SL, may be transmitted via DCI or SCI.

Note that the base station apparatus 10 illustrated in FIG. 2 may be replaced with the user equipment 20 having a scheduling capability. In FIG. 2, when the base station apparatus 10 is replaced with the user equipment 20, the reporting or scheduling transmission in step 1 and step 4 may be performed via SCI.

Figure 3:
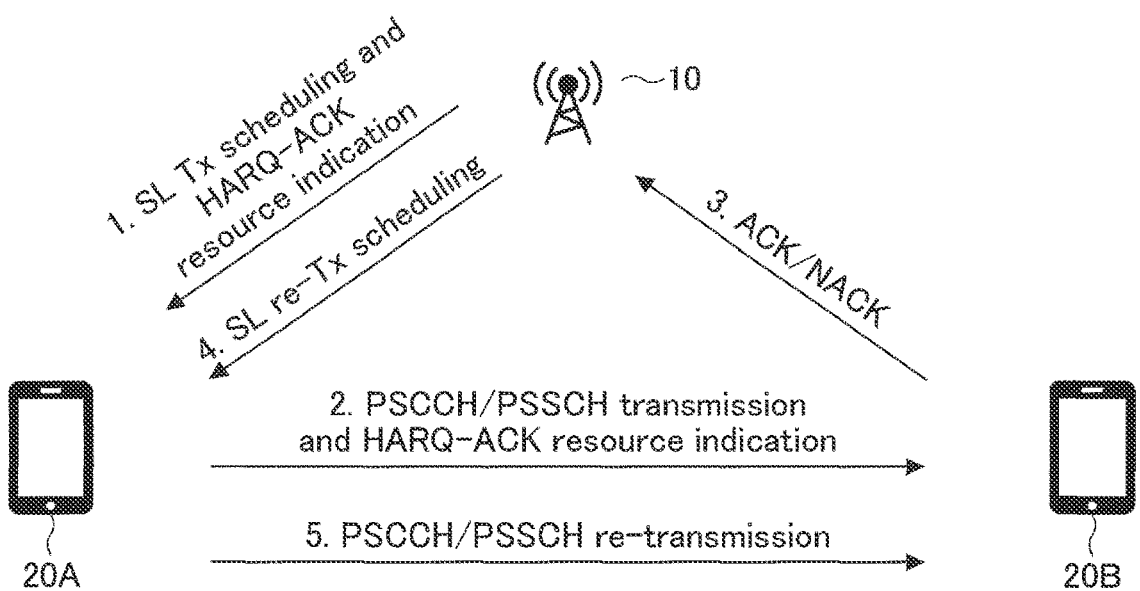
FIG. 3 is a diagram for describing an example (2) of HARQ re-transmission according to the embodiment of the present invention.

FIG. 3 is a diagram for describing an example (2) of HARQ re-transmission according to the embodiment of the present invention. As illustrated in FIG. 3, in step 1, the base station apparatus 10 transmits the SL scheduling information and a report indicating the HARQ response resource of SL to the user equipment 20A. Subsequently, in step 2, the user equipment 20A transmits signals via PSCCH and/or PSSCH and a report indicating the HARQ response resource of SL, to the user equipment 20B. Subsequently, in step 3, the user equipment 20B transmits, to the base station apparatus 10, the SL-ACK/NACK signaling determined based on the reception result of the signals via received PSCCH and/or PSSCH, by using the HARQ response resource indicated by the report received in step 2. Signals indicating ACK may not be transmitted, and only signals indicating NACK may be transmitted. Subsequently, in step 4, the base station apparatus 10 determines the SL scheduling information for re-transmission to the user equipment 20A, based on the received SL-ACK/NACK signaling, and transmits the SL scheduling information to the user equipment 20A. Subsequently, in step 5, the user equipment 20A re-transmits signals via PSCCH and/or PSSCH to the user equipment 20B, based on the received SL scheduling information for re-transmission.

As described above, the base station apparatus 10 can transmit a report indicating the HARQ response resource of SL to the user equipment 20. Furthermore, the base station apparatus 10 can transmit the SL scheduling information for re-transmission determined based on the received SL-ACK/NACK signaling to the user equipment 20. The user equipment 20 can transmit a report indicating the HARQ response resource of the St to another user equipment 20. A report indicating the HARQ response resource of SL or SL scheduling information for re-transmission may be transmitted via DCI or SCI.

Note that the base station apparatus 10 illustrated in FIG. 3 may be replaced with the user equipment 20 having a scheduling capability. In FIG. 3, when the base station apparatus 10 is replaced with the user equipment 20, the reporting or scheduling transmission in steps 1, 2 and 4 may be performed via the SCI.

Figure 4:
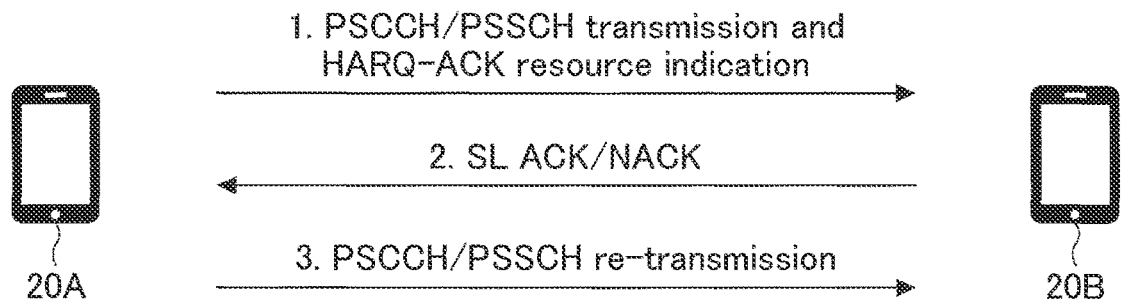
FIG. 4 is a diagram for describing an example (3) of HARQ re-transmission according to the embodiment of the present invention.

FIG. 4 is a diagram for describing an example (3) of HARQ re-transmission according to the embodiment of the present invention. As illustrated in FIG. 4, in step 1, the user equipment 20A transmits, to the user equipment 20B, signals via PSCCH and/or PSSCH and a report indicating the HARQ response resource of SL. Subsequently, in step 2, the user equipment 20B transmits, to the base station apparatus 10, the SL-ACK/NACK signaling determined based on the reception result of signals received via PSCCH and/or PSSCH, by using the HARQ response resource indicated by the report received in step 1. Signals indicating ACK may not be transmitted and only signals indicating NACK may be transmitted. Subsequently, in step 3, the user equipment 20 determines the St scheduling information for re-transmission based on the received SL-ACK/NACK signaling, and transmits the signals via PSCCH and/or PSSCH to the user equipment 20A based on the SL scheduling information.

As described above, the user equipment 20 can transmit a report indicating the HARQ response resource of SL, to another user equipment 20. Furthermore, the base station apparatus 10 can transmit the SL scheduling information for re-transmission determined based on the received SL-ACK/NACK signaling, to the user equipment 20. Furthermore, the user equipment 20 can transmit a report indicating the HARQ response resource of SL, to another user equipment 20. The report indicating the HARQ response resource of SL or the SL scheduling information for re-transmission may be transmitted via SCI.

Figure 5:
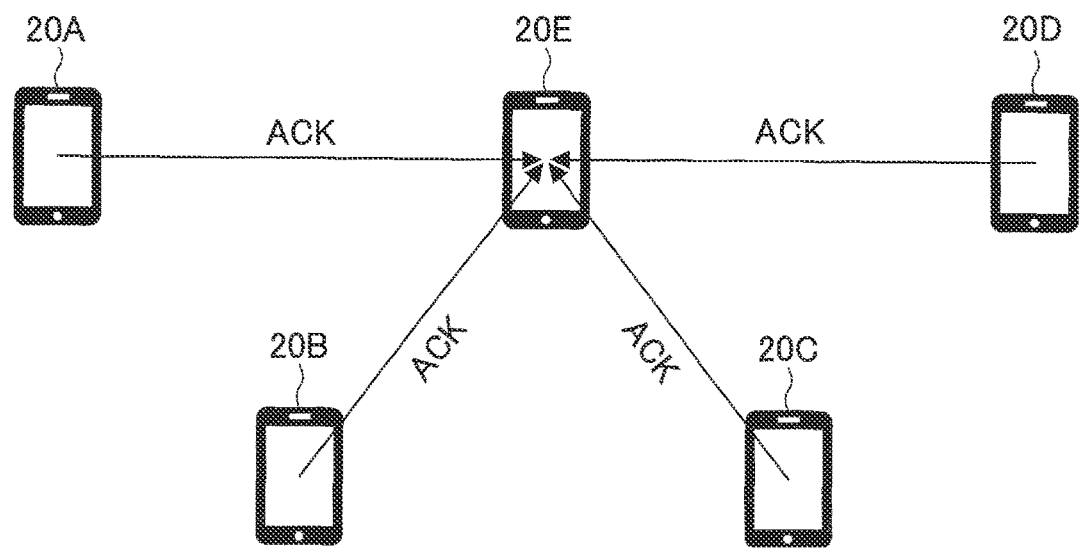
FIG. 5 is a diagram for describing an example of a HARQ response according to the embodiment of the present invention.

FIG. 5 is a diagram for describing an example of the HARQ response according to the embodiment of the present invention. The configuration of the HARQ response resource will be described below. As illustrated in FIG. 5, when the user equipment 20E performs multicasting or broadcasting to the user equipment 20A, the user equipment 20B, the user equipment 20C, and the user equipment 20D, the HARQ response resource may be commonly configured for the ACK/NACK responses of all user equipments 20, or may be configured for the ACK/NACK response of each user equipment 20.

Figure 6A:
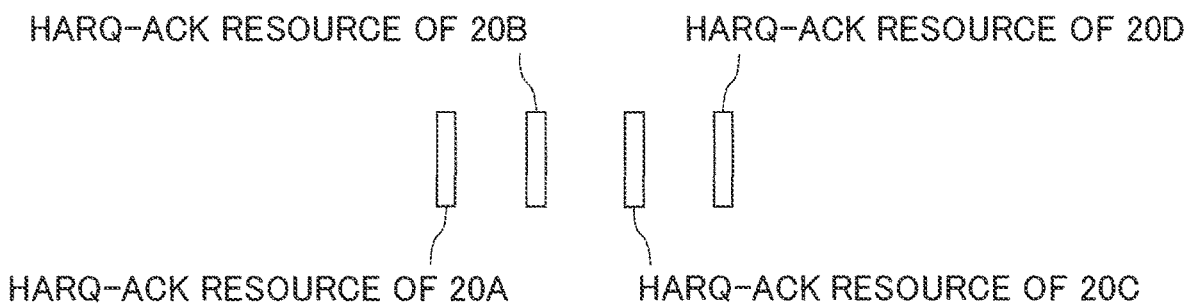
FIG. 6A is a diagram for describing an example (1) of resource allocation of a HARQ response according to the embodiment of the present invention.
Figure 6B:
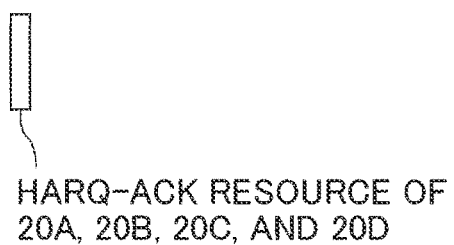
FIG. 6B is a diagram for describing an example (2) of resource allocation of a HARQ response according to the embodiment of the present invention.
Figure 6C:
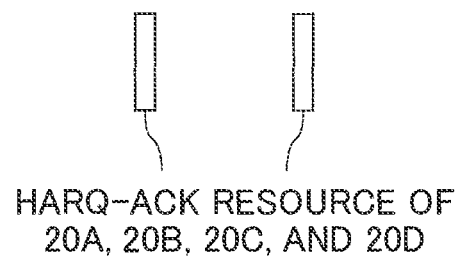
FIG. 6C is a diagram for describing an example (3) of resource allocation of a HARQ response according to the embodiment of the present invention.

FIG. 6A is a diagram for describing an example (1) of resource allocation of the HARQ response according to the embodiment of the present invention. FIGS. 6A, 6B, and 6C schematically illustrate HARQ response resources allocated to the user equipments 20, and indicate resources that are distinguished by the time domain, the frequency domain, or the code domain. As illustrated in FIG. 6A, the HARQ response resource of the user equipment 20A, the HARQ response resource of the user equipment 20B, the HARQ response resource of the user equipment 20C, and the HARQ response resource of the user equipment 20D are independently configured.

FIG. 6B is a diagram for describing an example (2) of resource allocation of the HARQ response according to the embodiment of the present invention. As illustrated in FIG. 6B, the HARQ response resource of the user equipment 20A, the HARQ response resource of the user equipment 20B, the HARQ response resource of the user equipment 20C, and the HARQ response resource of the user equipment 20D are commonly configured. Here, for example, FIG. 6B may illustrate a state in which the time domain, the frequency domain, and the code domain of the resource are commonly allocated to the four user equipments 20. Furthermore, for example, FIG. 6B may illustrate a state in which the time domain and the frequency domain of the resource are commonly allocated to the four user equipments 20, and in the code domain, the resource may be divided into a plurality of resources. Furthermore, FIG. 6B may illustrate a state in which one of the time domain, the frequency domain, and the code domain of the resource is commonly allocated to the four user equipments 20, and in the domains that are not commonly allocated, the resource may be divided into a plurality of resources.

When HARQ response resource is commonly defined or configured among a plurality of user equipments 20, one or more common HARQ response resources are defined or configured for one multicasting or broadcasting transmission.

FIG. 6C is a diagram for describing an example (3) of resource allocation of the HARQ response according to the embodiment of the present invention. As illustrated in FIG. 6C, two HARQ response resources are commonly configured for the user equipment 20A, the user equipment 20B, the user equipment 20C, and the user equipment 20D. The user equipment 20A, the user equipment 20B, the user equipment 20C, or the user equipment 20D randomly selects one of the two configured HARQ response resources. FIG. 6C illustrates an example in which the number of HARQ response resources is 2. However, the number of HARQ response resources may be 3, or any number from 2 to less than the number of user equipments 20 executing a HARQ response.

When the HARQ response resource is commonly defined or configured among the plurality of user equipments 20, the base station apparatus 10 or the user equipment 20 having a scheduling capability can semi-statically or dynamically configure whether to a HARQ response is to be executed, with respect to each user equipment 20. By configuring whether a HARQ response is to be executed, it is possible to control the number of user equipments 20 executing the HARQ response and the reception power of the HARQ response. The configuration as to whether to execute the HARQ response is reported to the user equipment 20 via RRC or DCI/SCI.

In the case where the HARQ response resource is commonly defined or configured among the plurality of user equipments 20, the receiving-side user equipment 20 may return NACK only when the data cannot be decoded and the RSSI (Received Signal Strength Indicator), the RSRP (Reference Signals Received Power), the RSRQ (Reference Signals Received Power), or the SINR (Signal-to-interference plus noise ratio) of the received signals exceeds a predetermined threshold value. For example, when the RSRP is extremely low, even if the HARQ response is transmitted from the receiving user equipment 20, there is a high possibility that the HARQ response will not reach the destination, and therefore the HARQ response is not transmitted.

Figure 7:
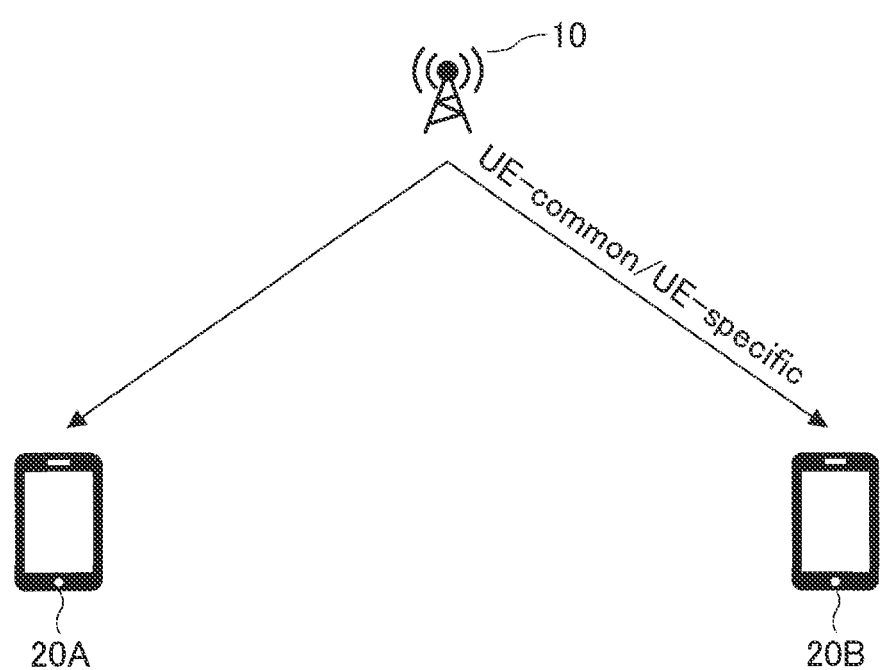
FIG. 7 is a diagram for describing an example (1) of reporting a HARQ response resource according to the embodiment of the present invention.
Figure 8:
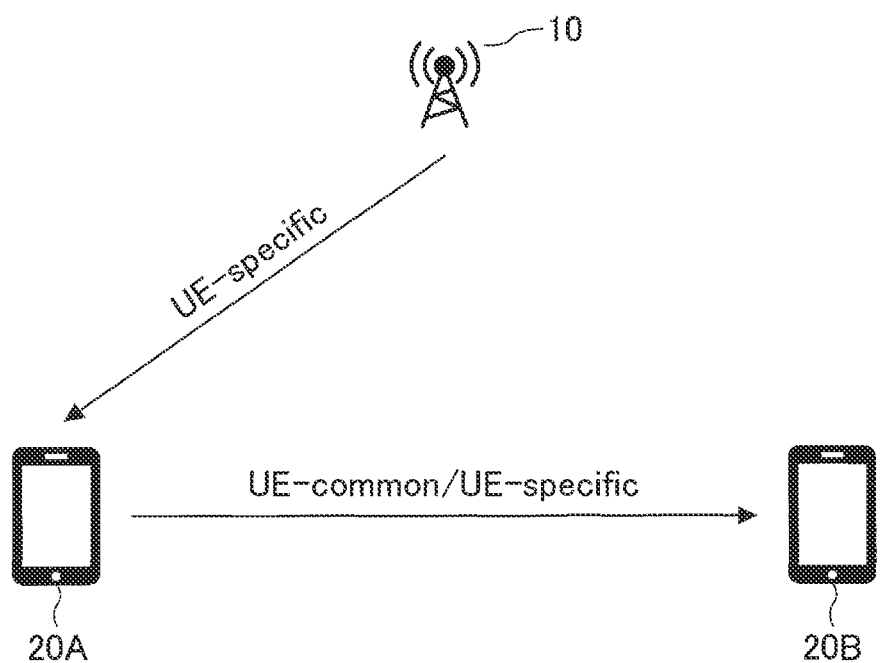
FIG. 8 is a diagram for describing an example (2) of reporting a HARQ response resource according to the embodiment of the present invention.
Figure 9:
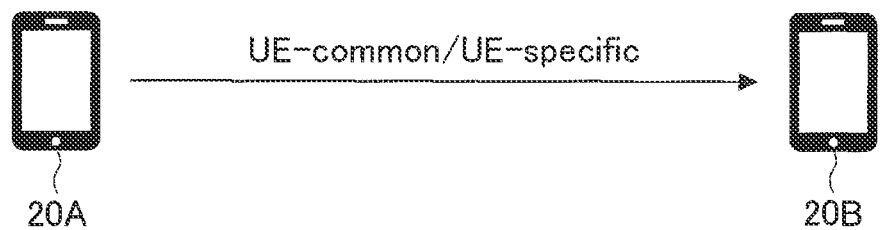
FIG. 9 is a diagram for describing an example (3) of reporting a HARQ response resource according to the embodiment of the present invention.

FIG. 7 is a diagram for describing an example (1) of the reporting of the HARQ response resource according to the embodiment of the present invention. In FIGS. 7, 8, and 9, a report in the case where the HARQ response resource is commonly defined or configured among a plurality of user equipments 20 is indicated as "UE-common", and a report in the case where the HARQ response resource is individually defined or configured for the AK/NACK response of each of the plurality of user equipments 20 is indicated as "UE-specific". Furthermore, in FIGS. 7, 8 and 9, the user equipment 20A is the SL transmission side and the user equipment 20B is the SL reception side. Signaling of "UE-common" or "UE-specific" for reporting the HARQ response resource may be performed with respect to a plurality of reception side user equipments 20, if the SL transmission is multicasting or broadcasting. Note that the base station apparatus 10 in FIGS. 7 and 8 may be replaced with the user equipment 20 having a scheduling capability.

As illustrated in FIG. 7, the base station apparatus 10 transmits the "UE-common" or "UE-specific" signaling for reporting the HARQ response resource, to the user equipment 20B. The "UE-common" or "UE-specific" signaling from the base station apparatus 10 may or may not be transmitted to the user equipment 20A. For example, the "UE-common" or "UE-specific" signaling may be scrambled with a group-common RNTI (Radio Network Temporary Identifier) or may be scrambled with a link-specific RNTI for identifying a side link, or may be scrambled with another RNTI derived from the transmitting-side user equipment 20A and/or the receiving-side user equipment 20B.

FIG. 8 is a diagram for describing an example (2) of the reporting of the HARQ response resource according to the embodiment of the present invention. As illustrated in FIG. 8, the base station apparatus 10 transmits the "UE-specific" signaling for reporting the HARQ response resource, to the user equipment 20A. The user equipment 20A transmits "UE-common" or "UE-specific" signaling to the user equipment 20B based on the received "UE-specific" signaling. The "UE-common" signaling transmitted to the user equipment 20B may be part of or the entirety of the HARQ response resource indicated by "UE-specific" signaling received from the base station apparatus 10.

FIG. 9 is a diagram for describing an example (3) of the reporting of the HARQ response resource according to the embodiment of the present invention. As illustrated in FIG. 9, the user equipment 20A transmits "UE-common" or "UE-specific" signaling for reporting the HARQ response resource, to the user equipment 20B.

Figure 10:
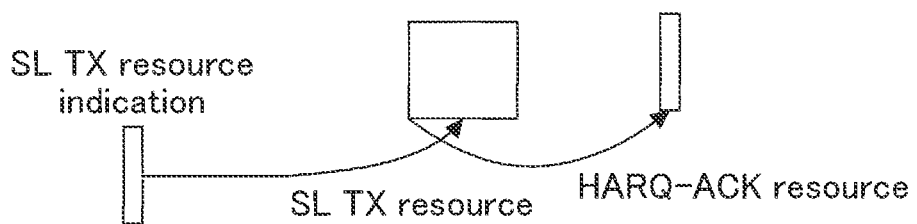
FIG. 10 is a diagram for describing an example (1) of specifying a HARQ response resource according to the embodiment of the present invention.

FIG. 10 is a diagram for describing an example (1) of specifying the HARQ response resource according to the embodiment of the present invention. As illustrated in FIG. 10, the SL transmission resource may be associated with the HARQ response resource of SL. Based on the position of the time domain, the frequency domain, or the code domain of the SL transmission resource, the HARQ response resource of SL may be identified. Furthermore, the HARQ response resource of SL may be identified based on the position of the time domain, the frequency domain, or the code domain of the signaling for scheduling the SL transmission resource.

Figure 11:
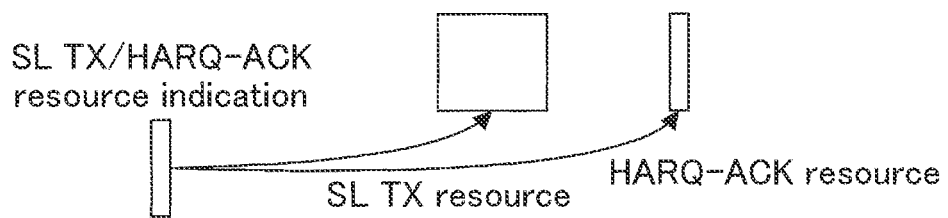
FIG. 11 is a diagram for describing an example (2) of specifying a HARQ response resource according to the embodiment of the present invention.

FIG. 11 is a diagram for describing an example (2) of specifying the HARQ response resource according to the embodiment of the present invention. As illustrated in FIG. 11, the HARQ response resource for SL and the SL transmission resource associated with the HARQ response resource for SL may be reported at the same time, by signaling for scheduling the SL transmission resource.

For the HARQ response resource of SL, the code domain or the frequency domain may be identified by the methods 1) to 5) indicated below.
1) The index of the HARQ response resource may be implicitly reported. For example, the index of the HARQ response resource may be identified based on the minimum CCE (Control Channel Element), the CORESET (Control resource set) index, the position of the resource allocated to PSCCH or PSSCH, or the DCI (PDCCH) reporting the HARQ response resource. That is, the method of determining the DL-HARQ response resource of LTE may be used to determine the SL-HARQ response resource. Furthermore, other signaling or parameters, etc., may be used. For example, the SCI payload size, the TPC command position, a common search space, or the resource of PSSCH may be used to determine HARQ response resource.
2) The HARQ response resource may be defined by a fixed association. The start position and the end position of PSSCH, and the SCI of the PSCCH associated with the PSSCH or the SCI of the PSCCH performing the SL scheduling, and the HARQ response resource, may have a fixed association. That is, the subchannel index and the index of the HARQ response resource are mapped on a one-to-one basis.
3) The HARQ response resource may be identified by upper layer signaling. The upper layer signaling is, for example, RRC signaling.
4) The HARQ response resource may be identified by PHY layer signaling. The PHY layer signaling is performed, for example, via DCI or SCI. The details of the HARQ response resource may be reported via PDSCH or PSSCH scheduled by DCI or SCI.
5) The HARQ response resource may be identified by a combination of the methods of 1) to 4) above.

In the HARQ response resource of SL, the time domain may be identified by the methods 1) to 5) indicated below.
1) Fixed timing offset defined from DCI that schedules SL
2) Fixed timing offset defined from PSSCH associated with SCI or SCI that schedules SL
3) The HARQ response resource may be identified by upper layer signaling. The upper layer signaling is, for example, RRC signaling.
4) The HARQ response resource may be identified by PHY layer signaling. The PHY layer signaling is performed, for example, via DCI or SCI. The details of the HARQ response resource may be reported via PDSCH or PSSCH scheduled by DCI or SCI.
5) The HARQ response resource may be identified by a combination of the methods of 1) to 4) above.

Note that when PUSCH or an SL transmission resource (including PSSCH and associated PSCCH) is scheduled, the HARQ response resource may be transmitted by using the scheduled PUSCH or SL transmission resource. That is, when PUSCH or an SL transmission resource (including PSSCH and associated PSCCH) is scheduled, the HARQ response resource identified by the above-described method does not have to be used.

Hereinafter, a method of HARQ re-transmission will be described. In unicasting, the base station apparatus 10, or the user equipment 20 having a scheduling capability, or the user equipment 20 for performing transmission, determines or executes re-transmission, upon receiving the NACK by the associated HARQ response resource.

On the other hand, in multicasting or broadcasting, when the HARQ response resource is commonly configured among the plurality of user equipments 20, the base station apparatus 10, the user equipment 20 having a scheduling capability, or the user equipment 20 for performing transmission, determines or executes re-transmission when one or more of the following conditions 1) to 4) are satisfied.
1) When NACK is received
2) When the reception power in the commonly configured HARQ response resource exceeds a predetermined threshold value
3) When a plurality of HARQ response resources are commonly configured, and the number of resources receiving NACK exceeds a predetermined threshold value
4) When a plurality of HARQ response resources are commonly configured, and the ratio of the resources receiving NACK to ail of the HARQ response resources exceeds a predetermined ratio Note that in the case of multicasting or broadcasting, when the HARQ response resource is commonly configured among a plurality of user equipments 20, the user equipment 20 transmits only NACK as the HARQ response, and does not have to transmit ACK.

Furthermore, in multicasting or broadcasting, when the HARQ response resource is individually configured for the ACK/NACK response of each of the plurality of user equipments 20, the base station apparatus 10, the user equipment 20 having a scheduling capability, or the user equipment 20 for performing transmission may execute re-transmission, when the number of response resources receiving NACK exceeds a predetermined threshold or when the ratio of resources receiving NACK to all of the HARQ response resources exceeds a predetermined ratio. Alternatively, in multicasting or broadcasting, when the HARQ response resource is individually configured for the ACK/NACK response of each of the plurality of user equipments 20, the base station apparatus 10, the user equipment 20 having a scheduling capability, or the user equipment 20 for performing transmission may execute re-transmission when the number of response resources receiving ACK is below a predetermined threshold or when the ratio of the resources receiving ACK to all of the HARQ response resources is below a predetermined ratio. Whether the re-transmission is to be executed by unicasting, multicasting, or broadcasting may be configured by the base station apparatus 10 or the user equipment 20 having a scheduling capability.

Figure 12:
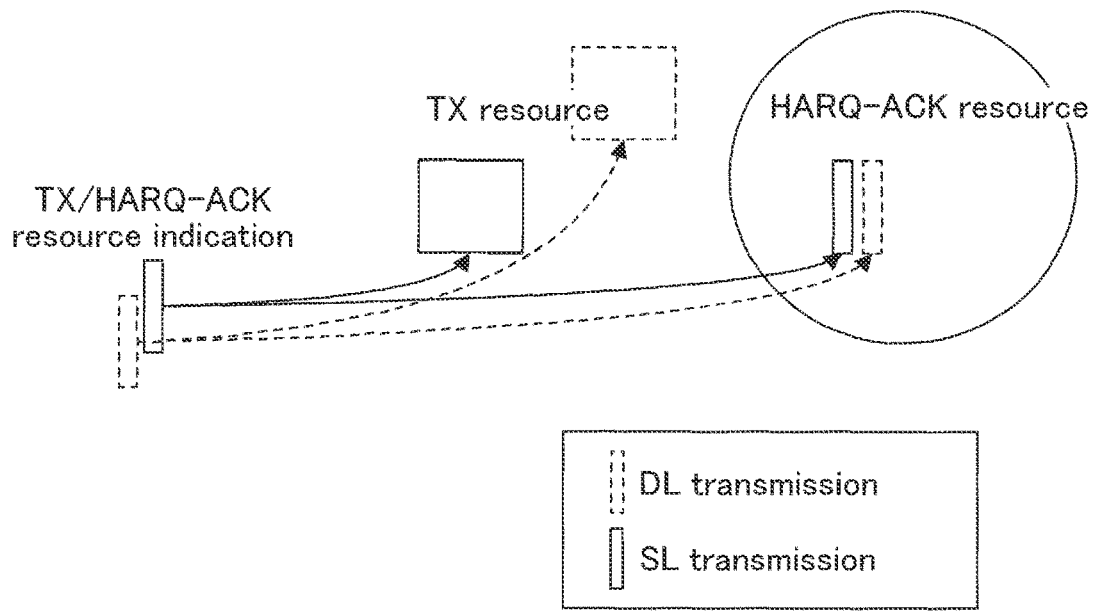
FIG. 12 is a diagram for describing an example (1) of multiplexing a HARQ response resource according to the embodiment of the present invention.

FIG. 12 is a diagram for describing an example (1) of multiplexing the HARQ response resource according to the embodiment of the present invention. FIG. 12 illustrates an example in which the HARQ response of DL and the HARQ response of SL are transmitted by separated resources. The user equipment 20 transmits a report indicating a transmission resource (TX resource) and a HARQ response resource (HARQ-ACK resource) in two separate UCIs via the PUCCH. The two UCIs include the UCI transmitted by the HARQ response resource of DL and the UCI transmitted by the HARQ response resource of SL. In order to avoid collision between the HARQ response of DL and the HARQ response of SL, a new UL channel and an individual PUCCH resource may be defined for transmission of the HARQ response of SL.

Figure 13:
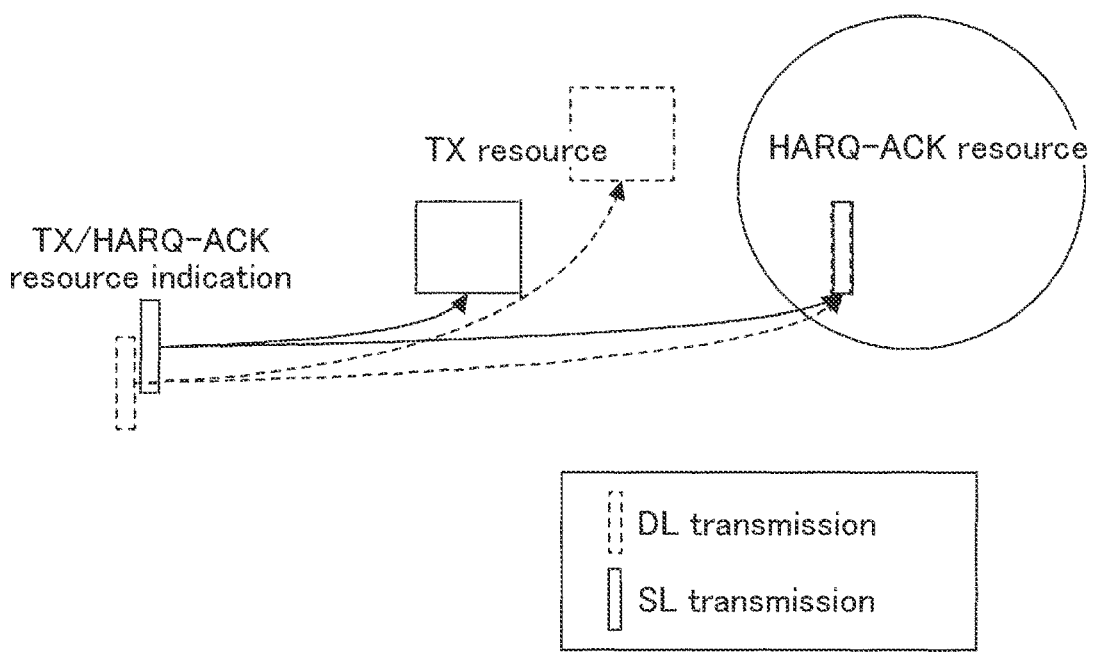
FIG. 13 is a diagram for describing an example of multiplexing a HARQ response resource according to the embodiment of the present invention.

FIG. 13 is a diagram for describing an example (2) of multiplexing the HARQ response resource according to the embodiment of the present invention. FIG. 13 illustrates an example in which a HARQ response of DL and a HARQ response of SL are transmitted by multiplexed resources. The user equipment 20 receives a report indicating the transmission resource and the HARQ response resource, by two separate UCIs via the PUCCH. The two UCIs include the UCI corresponding to the transmission resource and the HARQ response resource of DL, and the UCI corresponding to the transmission resource and the HARQ response resource of SL. As illustrated in FIG. 13, the HARQ response resource of DL and the HARQ response resource of SL are multiplexed and placed in the same resource. It is defined or configured in advance as to whether the user equipment 20 is to drop the HARQ response of DL or the HARQ response of SL, in a case where a resource, in which the HARQ response of DL and the HARQ response of SL are multiplexed, is allocated, and the HARQ response of DL and the HARQ response of SL collide with each other. Furthermore, in a case where a resource, in which the HARQ response of DL and the HARQ response of SL are multiplexed, is allocated, individual UCI fields may be defined for distinguishing the HARQ response of DL from the HARQ response of SL.

Note that the separating or the multiplexing of the HARQ response resource as described with reference to FIGS. 12 and 13, may be applied by replacing the HARQ response resource of DL and the HARQ response resource of SL, with the HARQ response resource for unicasting in SL and the HARQ response resource for multicasting or broadcasting in SL. That is, "DL transmission" illustrated in FIGS. 12 and 13 may be replaced with unicasting of SL, and "SL transmission" illustrated in FIGS. 12 and 13 may be replaced with multicasting or broadcasting of SL.

Note that the configuring and the reporting of a HARQ response resource may be performed jointly. That is, the configuring and the reporting of the HARQ response resource may be performed by one signaling. For example, the signaling for configuring and reporting the HARQ response resource may be performed via any one of PBCH (Physical Broadcast Channel), PSBCH Physical Sidelink Broadcast Channel), PDCCH (Physical Downlink Control Channel), PSCCH and/or PDSCH (Physical Downlink Shared Channel), and may be signaled via any one of the PHY layer, the MAC layer, and the RRC layer.

The instruction for re-transmission or the re-transmitted packet number may be reported by DCI or SCI for scheduling SL re-transmission, or may be reported by PSSCH associated with PSCCH including SCI.

The RV (Redundancy Version) pattern of initial transmission and the re-transmission may be configured or predefined. The RV pattern and/or the RV index may be reported by DCI or SCI for scheduling St re-transmission, or may be reported by PSSCH associated with PSCCH including SCI.

Note that the maximum number of re-transmissions may be configured or predefined. Furthermore, if there is a possibility that the packet delay request may be exceeded due to re-transmission, the re-transmission may be dropped.

According to the above-described embodiment, it is possible to introduce the HARQ response procedure in unicasting, multicasting, or broadcasting of and the QoS of SL transmission can be improved.

That is, re-transmission control can be appropriately performed in inter-terminal direct communication.

(Apparatus Configuration)

Next, a functional configuration example of the base station apparatus 10 and the user equipment 20 that execute the above-described processes and operations, will be described. The base station apparatus 10 and the user equipment 20 include functions for implementing the above-described embodiments. However, each of the base station apparatus 10 and the user equipment 20 may have only some of the functions of the embodiments.

<Base Station Apparatus 10>

Figure 14:
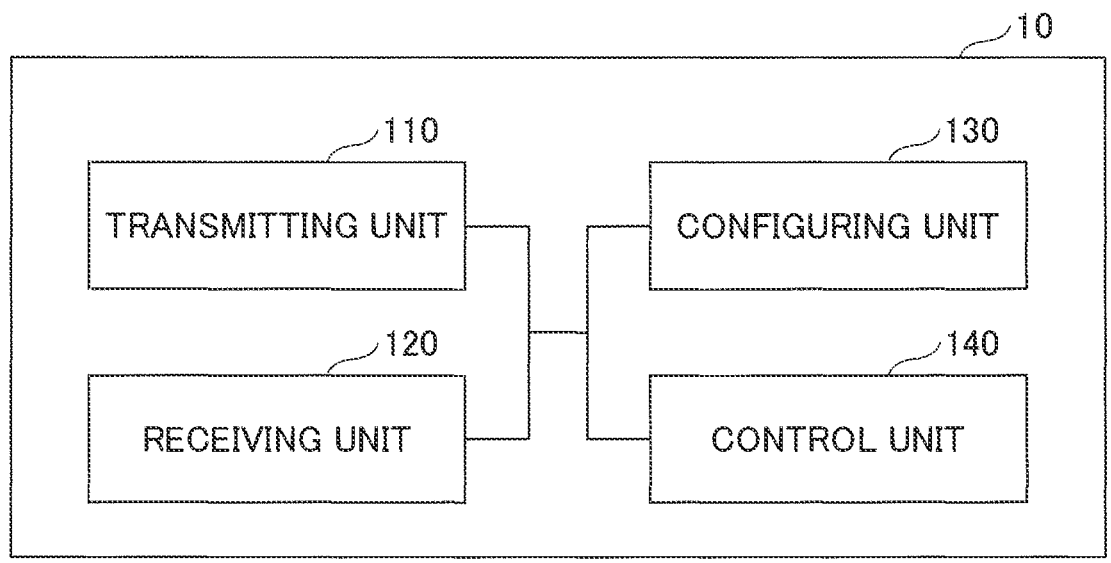
FIG. 14 is a diagram illustrating an example of a functional configuration of a base station apparatus 10 according to the embodiment of the present invention.

FIG. 14 is a diagram illustrating an example of a functional configuration of the base station apparatus 10. As illustrated in FIG. 14, the base station apparatus 10 includes a transmitting unit 110, a receiving unit 120, a configuring unit 130, and a control unit 140. The functional configuration illustrated in FIG. 14 is only an example. As long as the operations according to the embodiment of the present invention can be executed, the functional division and the name of the functional unit may be any functional division and name.

The transmitting unit 110 includes a function of generating signals to be transmitted to the user equipment 20, and transmitting the signals in a wireless manner. The receiving unit 120 includes a function of receiving various signals transmitted from the user equipment 20, and acquiring, for example, information of a higher layer from the received signals. Furthermore, the transmitting unit 110 has a function of transmitting NR-PSS, NR-SSS NR-PBCH, and DL/UL control signals, etc., to the user equipment 20. Furthermore, for example, the transmitting unit 110 transmits information indicating that another terminal is approaching the user equipment 20, and the receiving unit 120 receives the terminal information from the user equipment 20.

The configuring unit 130 stores pre-configured configuration information and various kinds of configuration information to be transmitted to the user equipment 20, in a storage device, and reads these pieces of information from the storage device as necessary. The content of the configuration information is, for example, information related to scheduling of D2D communication and a HARQ process.

As described in the embodiment, the control unit 140 performs processing related to configurations for performing D2D communication by the user equipment 20. Furthermore, the control unit 140 executes scheduling of D2D communication and a HARQ process. A functional unit related to signal transmission in the control unit 140, may be included in the transmitting unit 110, and a functional unit related to signal reception in the control unit 140, may be included in the receiving unit 120.

<User Equipment 20>

Figure 15:
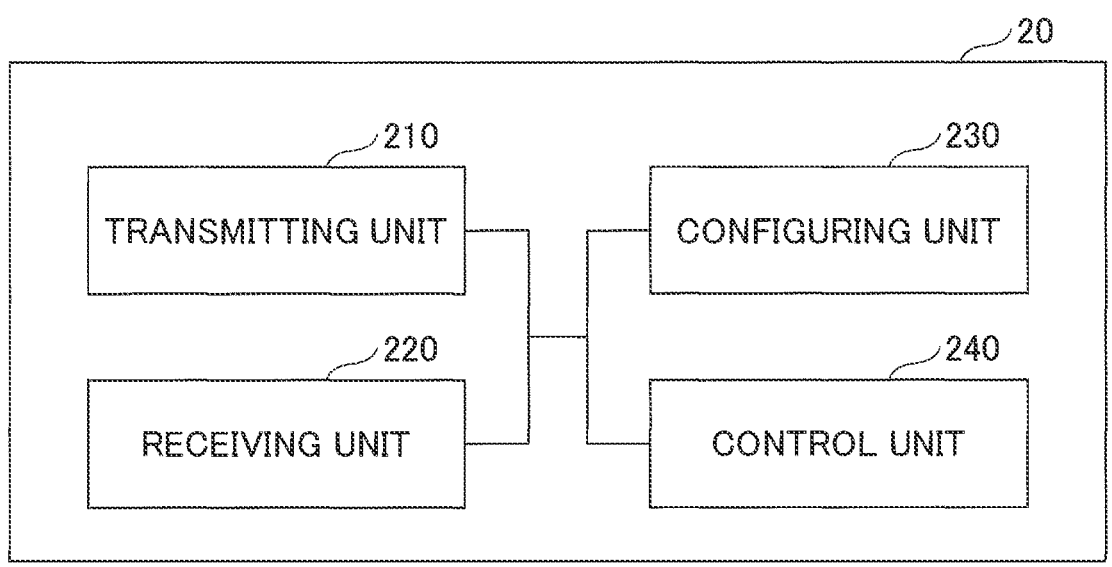
FIG. 15 is a diagram illustrating an example of a functional configuration of a user equipment 20 according to the embodiment of the present invention.

FIG. 15 is a diagram illustrating an example of a functional configuration of the user equipment 20. As illustrated in FIG. 15, the user equipment 20 includes a transmitting unit 210, a receiving unit 220, a configuring unit 230, and a control unit 240. The functional configuration illustrated in FIG. 15 is only an example. As long as the operations according to the embodiment of the present invention can be executed, the functional division and the name of the functional unit may be any functional division and name.

The transmitting unit 210 creates transmission signals from the transmission data and wirelessly transmits the transmission signals. The receiving unit 220 wirelessly receives various kinds of signals and acquires signals of a higher layer from the received signals of the physical layer. Furthermore, the receiving unit 220 has a function of receiving NR-PSS, NR-SSS, NR-PBCH, and DL/UL/SL control signals, etc., transmitted from the base station apparatus 10. Furthermore, for example, the transmitting unit 210 may transmit as D2D communication, to another user equipment 20, PSCCH (Physical Sidelink Control Channel), PSSCH (Physical Sidelink Shared Channel), PSDCH (Physical Sidelink Discovery Channel), and PSBCH (Physical Sidelink Broadcast Channel), etc., and the receiving unit 120 may receive, from another user equipment 20, PSCCH, PSSCH, PSDCH, or PSBCH, etc.

The configuring unit 230 stores various kinds of configuration information received from the base station apparatus 10 or the user equipment 20, by the receiving unit 220, in a storage device, and reads these pieces of information from the storage device as necessary. Furthermore, the configuring unit 230 also stores pre-configured configuration information. The content of the configuration information is, for example, information related to scheduling of D2D communication and a HARQ process.

As described in the embodiment, the control unit 240 controls the D2D communication executed with another user equipment 20. Furthermore, the control unit 240 executes scheduling of the D2D communication and a HARQ process. A functional unit related to signal transmission in the control unit 240 may be included in the transmitting unit 210, and a functional unit related to signal reception in the control unit 240 may be included in the receiving unit 220.

<Hardware Configuration>

The functional diagrams (FIGS. 14 and 15) used in the description of the above embodiment of the present invention illustrate blocks of functional units. These functional blocks (constituent parts) are implemented by any combination of hardware and/or software. Furthermore, the means for implementing each functional block is not particularly limited. That is, the respective functional blocks may be implemented by a single device in which a plurality of elements are physically and/or logically combined; or two or more devices, which are physically and/or logically separated, may be directly and/or indirectly (for example, wired and/or wireless) connected, and the respective functional blocks may be implemented by these plural devices.

Figure 16:
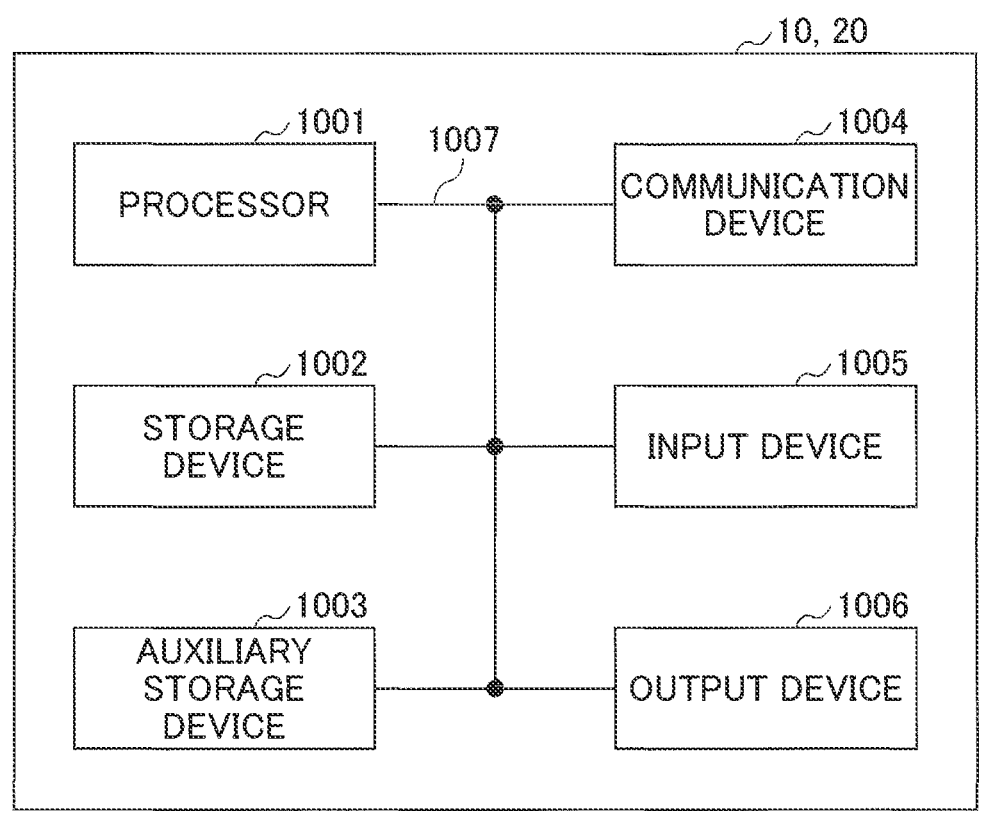
FIG. 16 is a diagram illustrating an example of a hardware configuration of the base station apparatus 10 or the user equipment 20 according to the embodiment of the present invention.

Furthermore, for example, both the base station apparatus 10 and the user equipment 20 according to one embodiment of the present invention may function as a computer that performs processes according to an embodiment of the present invention. FIG. 16 is a diagram illustrating an example of a hardware configuration of a radio communication apparatus that is the base station apparatus 10 or the user equipment 20 according to an embodiment of the present invention. Each of the base station apparatus 10 and the user equipment 20 described above may be physically configured as a computer device including a processor 1001, a storage device 1002, an auxiliary storage device 1003, a communication device 1004, an input device 1005, an output device 1006, and a bus 1007, etc.

Note that in the following description, the term "device" can be read as a circuit, a device, and a unit, etc. The hardware configuration of the base station apparatus 10 and the user equipment 20 may be configured to include one or a plurality of devices indicated by the reference numerals 1001 to 1006 illustrated in the drawing, or may be configured to not include some of the devices.

The respective functions of the base station apparatus 10 and the user equipment 20 are implemented by having predetermined software (programs) to be loaded in the hardware such as the processor 1001 and the storage device 1002 so that the processor 1001 performs computation and controls the communication performed by the communication device 1004 and the reading and/or writing of data in the storage device 1002 and the auxiliary storage device 1003.

The processor 1001, for example, operates the operating system to control the entire computer. The processor 1001 may be configured with a Central Processing Unit (CPU) including an interface with peripheral devices, a control device, an arithmetic device, and a register, etc.

Furthermore, the processor 1001 loads programs (program codes), software modules, or data from the auxiliary storage device 1003 and/or the communication device 1004 into the storage device 1002, and executes various processes according to these elements. As the program, a program for causing a computer to execute at least part of the operation described in the above embodiment, is used. For example, the transmitting unit 110, the receiving unit 120, the configuring unit 130, and the control unit 140 of the base station apparatus 10 illustrated in FIG. 14 may be implemented by a control program that is stored in the storage device 1002 and that operates on the processor 1001. Furthermore, for example, the transmitting unit 210, the receiving unit 220, the configuring unit 230, and the control unit 240 of the user equipment 20 illustrated in FIG. 15 may be implemented by a control program that is stored in the storage device 1002 and that operates on the processor 1001. Although it has been described that the various processes described above are executed by a single processor 1001, the various processes described above may be executed simultaneously or sequentially by two or more processors 1001. The processor 1001 may be implemented by one or more chips. Note that the programs may be transmitted from the network via an electric communication line.

The storage device 1002 is a computer-readable recording medium, and is configured with at least one of a ROM (Read-Only Memory), an EPROM (Erasable Programmable ROM), an EEPROM (Electrically Erasable Programmable ROM), and a RAM (Random Access Memory), for example. The storage device 1002 may be referred to as a register, a cache, and a main memory (main memory), etc. The storage device 1002 can store executable programs (program codes) and software modules, etc., for implementing the processes according to an embodiment of the present invention.

The auxiliary storage device 1003 is a computer-readable recording medium, and may be configured with at least one of, for example, an optical disk such as a CD-ROM (Compact Disc ROM), a hard disk drive, a flexible disk, a magneto-optical disk (for example, a compact disk, a digital versatile disk, a Blu-ray (Registered trademark) disk), a smart card, a flash memory (for example, a card, a stick, a key drive), a floppy (registered trademark) disk, and a magnetic strip, etc. The auxiliary storage device 1003 may be referred to as an auxiliary storage device. The above-described storage medium may be, for example, a database including the storage device 1002 and/or the auxiliary storage device 1003, a server, or other appropriate media.

The communication device 1004 is hardware (transmission/reception device) for performing communication between computers via a wired and/or wireless network, and is also referred to as a network device, a network controller, a network card, and a communication module, etc., for example. For example, the transmitting unit 110 and the receiving unit 120 of the base station apparatus 10 may be implemented by the communication device 1004. Furthermore, the transmitting unit 210 and the receiving unit 220 of the user equipment 20 may be implemented by the communication device 1004.

The input device 1005 is an input device (for example, a keyboard, a mouse, a microphone, a switch, a button, and a sensor, etc.) that accepts input of information from the outside. The output device 1006 is an output device (for example, a display, a speaker, and an LED lamp, etc.) that outputs information to the outside. Note that the input device 1005 and the output device 1006 may be integrated (for example, a touch panel).

Furthermore, the respective devices such as the processor 1001 and the storage device 1002 are connected by the bus 1007 for communicating information. The bus 1007 may be configured with a single bus or may be configured with different buses between the respective devices.

Furthermore, each of the base station apparatus 10 or the user equipment 20 may include hardware such as a microprocessor, a digital signal processor (DSP), an application specific integrated circuit (ASIC), a programmable logic device (PLD), and a field programmable gate array (FPGA), and some of or all of the functional blocks may be implemented by this hardware. For example, the processor 1001 may be implemented with at least one of these hardware elements.

Overview of Embodiment

As described above, according to the embodiment of the present invention, there is provided a user equipment including a receiving unit configured to receive a first signal of inter-terminal direct communication transmitted from a first user equipment, and information indicating first resource for transmitting a HARQ (Hybrid Automatic Repeat Request) response corresponding to the first signal of inter-terminal direct communication transmitted from either one of a base station apparatus or the first user equipment; a control unit configured to determine the HARQ response based on a reception result of the first signal of inter-terminal direct communication; and a transmitting unit configured to transmit the determined HARQ response to the base station apparatus or the first user equipment, by using the first resource for transmitting the HARQ response.

With the above configuration, it is possible to introduce the HARQ response procedure to the unicasting of SL, and it is possible to improve the QoS of SL transmission. That is, in inter-terminal direct communication, re-transmission can be appropriately controlled.

The transmitting unit may transmit, to a second user equipment, a second signal of inter-terminal direct communication, and information indicating a second resource for transmitting a HARQ response corresponding to the second signal of inter-terminal direct communication received from the base station apparatus. With this configuration, it is possible to introduce the HARQ response procedure to the unicasting of SL, and it is possible to improve the QoS of SL transmission.

The receiving unit may receive, from the base station apparatus, scheduling information for re-transmission of the second signal of inter terminal direct communication determined based on HACK (Negative Acknowledgement) that is the HARQ response transmitted from the second user equipment, and the transmitting unit may re-transmit, to the second user equipment, the second signal of inter-terminal direct communication, based on the scheduling information for re-transmission. With this configuration, it is possible to introduce the HARQ response procedure to the unicasting of SL, and it is possible to improve the QoS of SL transmission.

The receiving unit may receive, from the base station apparatus, information indicating a third resource for transmitting a HARQ response corresponding to a third signal of inter-terminal direct communication that is a multicast or a broadcast, the transmitting wait may transmit the third signal of inter-terminal direct communication to a plurality of user equipments, the receiving unit may receive HARQ responses from the plurality of user equipments, via the third resource for transmitting the HARQ response, and the transmitting unit may re-transmit the third signal of inter-terminal direct communication, when a number of received HARQ NACK responses, or a ratio of the received HARQ NACK responses to the third resource for transmitting the HARQ response, exceeds a predetermined threshold. With this configuration, it is possible to introduce the HARQ response procedure to the multicasting or broadcasting of SL, and it is possible to improve the QoS of SL transmission.

The receiving unit may receive, from the base station apparatus, information indicating a fourth resource for transmitting a HARQ response corresponding to a fourth signal of downlink and a fifth resource for transmitting a HARQ response corresponding to a fifth signal of inter-terminal direct communication, the fourth resource and the fifth resource may be the same resource, and the control unit may configure which one of the HARQ response corresponding to the fourth signal and the HARQ response corresponding to the fifth signal is to be dropped, when the HARQ response corresponding to the fourth signal of downlink and the HARQ response corresponding to the fifth signal of inter terminal direct communication collide with each other. With this configuration, the user equipment 20 can transmit the HARQ response of SL and the HARQ response of DL with multiplexed resources, and can select the HARQ response of SL or the HARQ response of DL as necessary.

Furthermore, according to the embodiment of the present invention, there is provided a base station apparatus including a transmitting unit configured to transmit, to a first user equipment, scheduling information of a signal of inter-terminal direct communication to be transmitted from the first user equipment to a second user equipment, and transmit, to the second user equipment, information indicating a resource for transmitting a HARQ (Hybrid Automatic Repeat Request) response corresponding to the signal of inter-terminal direct communication; a receiving unit configured to receive the HARQ response transmitted from the second user equipment; and a control unit configured to transmit, to the first user equipment, scheduling information for re-transmission of the signal of inter-terminal direct communication, when the received HARQ response is NACK (Negative Acknowledgement).

With the above configuration, it is possible to introduce the HARQ response procedure to the unicasting of SL, and it is possible to improve the QoS of SL transmission. That is, in inter-terminal direct communication, re-transmission can be appropriately controlled.

Supplement to Embodiment

The exemplary embodiment of the present invention is described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for description, but the numerical values are merely examples, and certain suitable values may be used unless otherwise stated. The classification of items in the above description is not essential to the present invention, matters described in two or more items may be combined and used as necessary, and a matter described in one item may be applied to a matter described in another item (unless there is no contradiction). The boundary between functional units or processing units in a functional block diagram does not necessarily correspond to the boundary between physical parts. Operations of a plurality of functional units may be performed physically by one component, or an operation of one functional unit may be performed physically by a plurality of parts. In the processing procedures described in the embodiment, the order of processes may be changed as long as there is no inconsistency. For the sake of convenience of description, the base station apparatus 10 and the user equipment 20 have been described using the functional block diagrams, but such apparatuses may be implemented by hardware, software, or a combination thereof. Software executed by the processor included in the base station apparatus 10 according to the embodiment of the present invention, and the software executed by the processor of the user equipment 20 according to the embodiment of the present invention, may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, notification of information is not limited to the aspect/embodiment described in the present specification, and may be performed by other methods. For example, the notification of information may be performed by physical layer signaling (for example, DCI (Downlink Control Information), UCI (Uplink Control Information)), upper layer signaling (for example, RRC (Radio Resource Control) signaling, MAC (Medium Access Control) signaling, broadcast information (MIB (Master Information Block), SIB (System Information Block)), other signals, or a combination of these methods. Furthermore, the RRC signaling may be referred to as an RRC message, and may be, for example, an RRC Connection Setup message or an RRC Connection Reconfiguration message, etc.

Each aspect/embodiment described in the present specification may be applied to LTE (Long Term Evolution), LTE-A (LTE-Advanced), SUPER 3G, IMT-Advanced, 4G, 5G, FRA (Future Radio Access), W-CDMA (registered trademark), GSM, (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth(registered trademark), and a system using other appropriate systems and/or a next generation system expanded based on these systems.

In the processes, sequences, and flowcharts, etc., in each aspect/embodiment described in the present specification, the order or processes may be exchanged, as long as there is no inconsistency. For example, for the methods described in the present specification, elements of the various steps are presented in an exemplary order and are not limited to the presented specific order.

The specific operation that is performed by the base station apparatus 10 in the present specification may be performed by an upper node of the base station apparatus 10 in some cases. It is obvious that in a network including one or more network nodes including the base station apparatus 10, various operations performed for communication with the user equipment 20, may be performed by the base station apparatus 10 and/or a network node of other than the base station apparatus 10 (for example, MME or S-GW, etc., although not limited as such). In the above example, there is one network node other than the base station apparatus 10; however, a combination of a plurality of other network nodes (for example, MME and S-GW) may be used.

Each aspect/embodiment described in the present specification may be used singly or in combination, or may be switched in accordance with execution.

The user equipment 20 may be referred to, by those skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

The base station apparatus 10 may be referred to, by those skilled in the art, as a NB (Node B), an eNB (evolved Node B), gNB, a Base Station, or some other suitable term.

The terms "determining" and "deciding" used in the present specification may encompass a wide variety of operations. "Determining" and "deciding" may include the meaning of, for example, judging, calculating, calculating, computing, processing, deriving, investigating, looking up (for example, searching a table, a database, or another data structure), and ascertaining, etc. Furthermore, "determining" and "deciding" may include the meaning of receiving (for example, receiving information), transmitting (for example, transmitting information), inputting, outputting, and accessing (for example, accessing data in a memory). Furthermore, "determining" and "deciding" may include the meaning of resolving, selecting, choosing, establishing, and comparing, etc. In other words, "determining" and "deciding" include the meaning of "determining" and "deciding" some kind of operation.

The phrase "based on" used in the present specification does not mean "based only on", unless explicitly stated otherwise. In other words, the phrase "based on" means both "based only on" and "based on at least".

The terms "include", "including", and variations thereof used in the present specification or claims, are intended to be inclusive in a manner similar to the term "comprising". Furthermore, the term "or" used in the present specification or claims, is not intended to be exclusive OR.

In the entire present disclosure, if articles are added by translation, such as a, an, and the in English, for example, these articles may include a plural number of items/units, unless it is indicated that these articles are obviously not plural from the context.

Note that in the embodiments of the present invention, signals via PSCCH and/or PSSCH are examples of signals of inter terminal direct communication.

Although the present invention has been described in detail above, it will be obvious to those skilled in the art that the present it is not limited to the embodiments described herein. The present invention can be implemented as modifications and variations without departing from the spirit and scope of the present invention as defined by the scope of the claims. Therefore, the description of the present specification is for the purpose of illustration and does not have any restrictive meaning to the present invention.

REFERENCE SIGNS LIST 10 base station apparatus
110 transmitting snit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device
1005 input device
1006 output device

The invention claimed is:

1. A terminal comprising:
a receiver configured to receive, from a base station, simultaneously information indicating a first resource for transmitting a signal of inter-terminal direct communication and information indicating a second resource for transmitting HARQ (Hybrid Automatic Repeat Request) response corresponding to the signal of inter-terminal direct communication; and
a transmitter configured to transmit the signal of inter-terminal direct communication to another terminal by using the first resource,
wherein the receiver receives the HARQ response from the other terminal, and the transmitter transmits the HARQ response to the base station by using the second resource.

2. The terminal according to claim 1, wherein
the transmitter transmits the signal of inter-terminal direct communication to other terminals, and
the receiver receives only signals indicating NACK from the other terminals and does not receive signals indicating ACK from the other terminals.

3. The terminal according to claim 1, wherein the receiver receives the HARQ response from the other terminal by using a third resource associated with a location in time domain of the first resource.

4. The terminal according to claim 1, wherein the receiver receives a higher layer parameter from the base station and specifies a third resource for receiving the HARQ response from the other terminal based on the higher layer parameter.

5. The terminal according to claim 1, wherein the transmitter transmits, to the other terminal, PHY layer control information for specifying a third resource for receiving the HARQ response from the other terminal.

6. A communication system comprising: a first terminal, a second terminal, and a base station,
wherein the first terminal includes:
a receiver configured to receive, from the base station, simultaneously information indicating a first resource for transmitting a signal of inter-terminal direct communication and information indicating a second resource for transmitting HARQ (Hybrid Automatic Repeat Request) response corresponding to the signal of inter-terminal direct communication; and
a transmitter configured to transmit the signal of inter-terminal direct communication to the second terminal by using the first resource,
wherein the receiver receives the HARQ response from the second terminal, and
the transmitter transmits the HARQ response to the base station by using the second resource,
wherein the second terminal includes:
a receiver configured to receive, from the first terminal, the signal of inter-terminal direct communication by using the first resource, and
a transmitter configured to transmit the HARQ response to the first terminal,
wherein the base station includes:
a transmitter configured to transmit, to the first terminal, simultaneously information indicating the first resource and information indicating the second resource, and
a receiver configured to receive, from the first terminal, the HARQ response by using the second resource.

7. A communication method performed by a terminal comprising:
receiving, from a base station, simultaneously information indicating a first resource for transmitting a signal of inter-terminal direct communication and information indicating a second resource for transmitting HARQ (Hybrid Automatic Repeat Request) response corresponding to the signal of inter-terminal direct communication;
transmitting the signal of inter-terminal direct communication to another terminal by using the first resource;
receiving the HARQ response from the other terminal; and
transmitting the HARQ response to the base station by using the second resource.

* * * * *